July 30, 1963   W. K. BERG ETAL   3,099,285
VENT AND RELIEF VALVE
Filed Sept. 1, 1959   3 Sheets-Sheet 1
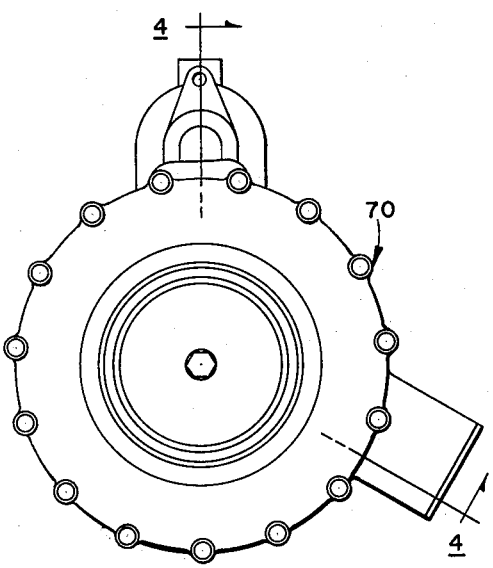
FIG. 3
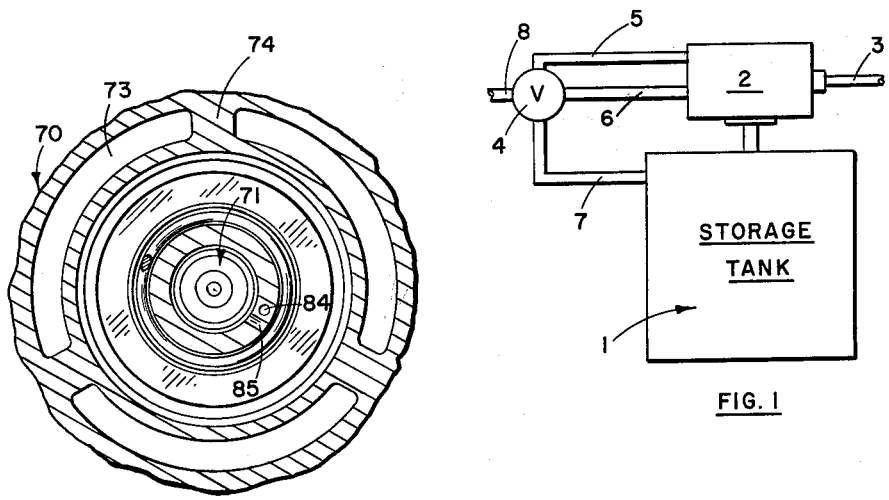
FIG. 5
FIG. 1
INVENTORS.
WILLIAM K. BERG
ROBERT A. RIDDELL
BY EUGENE G. SPENCER
LLOYD E. TOMLINSON
ATTORNEY July 30, 1963  W. K. BERG ETAL  3,099,285
VENT AND RELIEF VALVE Filed Sept. 1, 1959  3 Sheets-Sheet 3

INVENTORS.
WILLIAM K. BERG
ROBERT A. RIDDELL
BY EUGENE G. SPENCER
LLOYD E. TOMLINSON
Thomas S. MacDonald
ATTORNEY

United States Patent Office 3,099,285
Patented July 30, 1963

3,099,285
VENT AND RELIEF VALVE
William K. Berg, Thousand Oaks, Robert A. Riddell, Los Angeles, Eugene G. Spencer, Canoga Park, and Lloyd E. Tomlinson, Woodland Hills, Calif., assignors to North American Aviation, Inc.
Filed Sept. 1, 1959, Ser. No. 837,548
7 Claims. (Cl. 137—220)

This invention relates to vent and relief valves and more particularly to valves operable to relieve excessive gas and vapor pressures for the protection of storage vessels or systems to which they are adapted.

With the inception of the missile art, it has become increasingly important that valving for pressurized systems be simple and yet virtually fool-proof in functional operability. The malfunction of a single valve in such applications may cause the destruction of a multi-million dollar system. A major problem inherent in standard vent valves for missile utilization is their non-adaptability for cyrogenic uses wherein temperatures are in the order of —350° F. Under such conditions there is a tendency for the valve components to freeze in either the open or closed position with a consequent system failure. Another problem has been the large difference in pressure required in opening a vent valve from the initial cracked position to the fully opened position. Pressure changes on the order of 40 pounds per square inch (p.s.i.) have heretofore been required to complete such actuation.

The structural characteristics of the present valves include the inherent ability to resist malfunction due to freezing. This problem is particularly obviated by the inclusion of an override system as a safety feature. The override is capable of overcoming normal tank operation responsive to an independent signal from a pressurized supply tank. A pilot valve controlled actuating system utilizing supply tank pressure is also featured. As little as 3 p.s.i. differential is required to move the main valve from the cracked to the fully opened position.

Venting, as used herein, means the opening of the valve during tank filling operations, allowing evolved gases to be exchausted directly.

Relieving, as used herein, refers to the opening of the valve after tank filling has been completed to relieve excessive pressures built up after the vent valve has initially closed.

The valve herein disclosed is particularly suited for operation with cyrogenic fluids and is generally intended to operate at pressures under 100 p.s.i. However, its structural characteristics make it fully operable over a wide range of temperatures and pressures and with a large number of fluids.

It is an object of this invention to provide a valve capable of both venting and relieving under adverse temperature conditions.

Another object is to provide a vent and relief valve including means for preventing valve malfunction by overriding normal valve operation.

Yet another object is to provide a vent and relief valve capable of relieving pressure throughout the operational cycle of the tank to which it is adapted and capable of being actuated from a cracked to a fully open position with a minimum of pressure differential.

Other objects of this invention will become apparent from the following description taken in connection with the accompanying drawings, in which:

FIG. 1 is a schematic diagram showing the valve in a typical application;

FIG. 3 is an end view of a second configuration of the valve of the invention;

FIG. 5 is a section taken along line 5—5 of FIG. 4.

The schematic diagram of FIG. 1 illustrates a fluid storage tank 1 to which the vent and relief valve 2 of this invention is attached, the function of the valve being to provide a controlled opening from the storage tank through which gases evolved during the filling and storage phases may escape. An exhaust line 3, connected to valve 2, provides an exit for the evolved gases. A valve, or series of valves 4, may be connected between tank 1 and valve 2 by lines 5, 6, and 7, and/or to an independent pressure source (not shown) by line 8 for valve override control.

Figure 2:
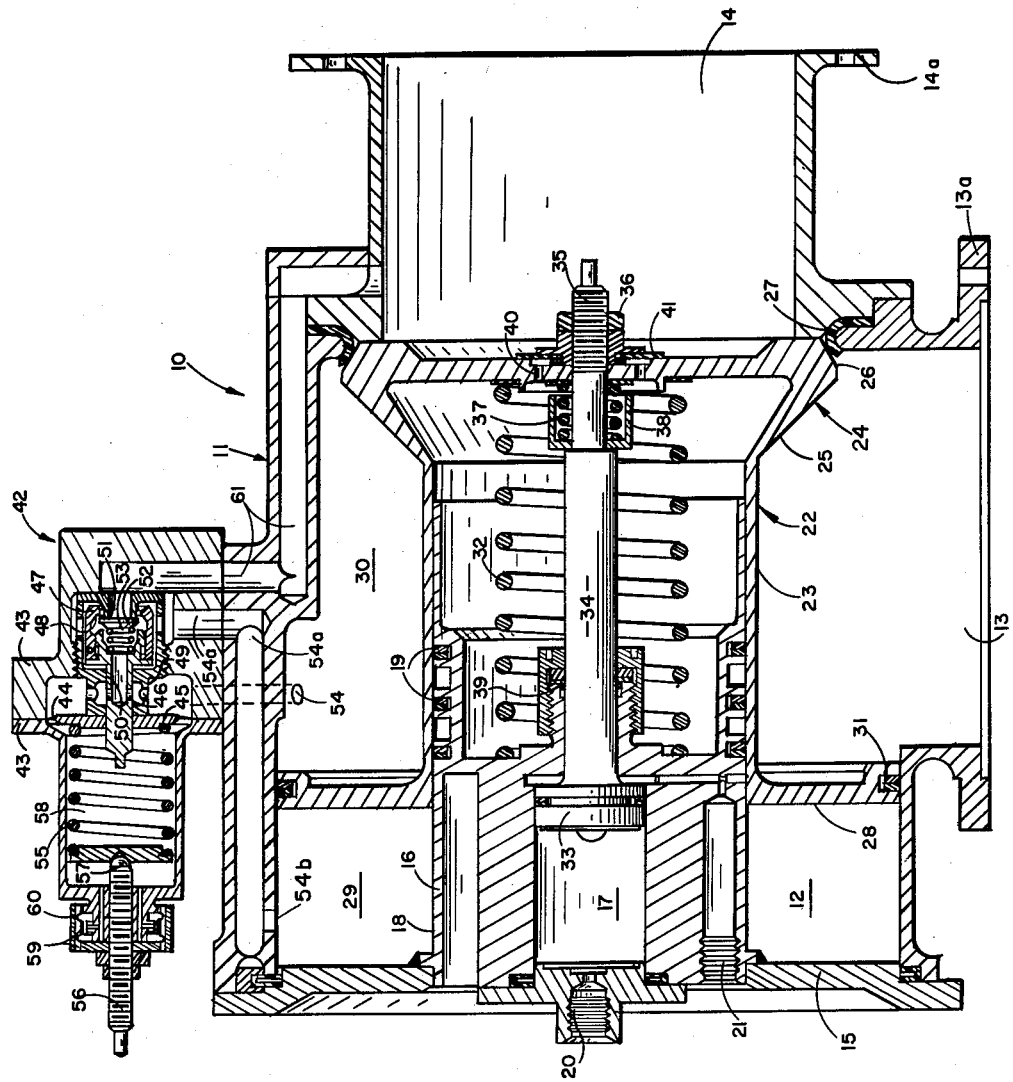
FIG. 2 is a sectional view through a valve constructed in accordance with this invention.

FIG. 2 is a representation of one configuration of this invention. Therein, the vent and relief valve proper is generally indicated as 10 and the valve housing is generally indicated as 11. Housing 11 includes a cylindrical portion or cylinder 12, an inlet port 13 having a flange 13a for attachment to a storage tank, and an outlet port 14 having a flange 14a adapted for attachment to an exhaust line. A cover plate 15, which may be considered a part of valve housing 11, is secured and sealed over one end of cylindrical portion 12. An override mechanism housing 16 is attached to and extends into the interior of valve housing 11 from cover plate 15 coaxial with cylinder 12. Override housing 16 has included therein a cylinder 17. External surface 18 of the override housing is preferably cylindrical and adapted for sliding contact with a later described poppet. One or more piston rings or seals 19 may be retained in a portion of surface 18. Ports 20 and 21 lead into opposite ends of cylinder 17 from the exterior of the valve.

A poppet, generally indicated as 22, has a hollow body portion 23 slidably mounted upon external surface 18 of housing 16. A head portion 24 on one end of the poppet includes an annular surface 25 and an annular seat 26 adapted for seating in seal 27. Seal 27 is retained about port 14 between two portions of housing 11 and is preferably a lip seal having its free end directed internally of valve housing 11 in such a manner that annular seat 26, when inserted within the seal, is contacted in a line contact about the seat periphery. When pressures internally of the valve housing bear upon the lip seal, the tendency is then for the lip of the seal to be pressure actuated into greater sealing contact with seat 26.

A radially extending annular flange 28 forms a portion of poppet 22 opposite head portion 24. Flange 28 extends into sealing contact with the surface of cylindrical portion 12 of the valve housing, dividing the interior of valve housing 11 into separate compartments 29 and 30. A seal 31 is provided in the periphery of flange 28 for preventing the by-pass of gases between compartments 29 and 30.

A spring 32 is mounted interiorly of poppet 22. It bears against head 24 and overriding housing 16 and urges poppet 22 toward its seated, or closed, position.

A piston 33, mounted for reciprocation interiorly of cylinder 17, has a shaft 34 extending from one side thereof through the internal end of cylinder 17 and head portion 23 of poppet 22. A far end 35 of shaft 34 is slidably retained in head 24 by means of nut 36. A compression spring 37 is retained about shaft 34 in contact with poppet head 24 by a retainer 38.

While the tank to which valve 10 is adapted is being filled with fluid, particularly in the case of cyrogenic fluids, there is an evaporation or boil-off from the fluids being tanked and it is, therefore, necessary that a vent be opened at all times during the tanking procedure. This facilitates tank filling by preventing the build up of pressures which would otherwise prevent the free flow of fluid into the tank. The vent may be opened to the fully open position or to any desired intermediate position through the actuation of the override mechanism. This is the prime purpose of piston 33 and its associated structure. A secondary purpose is to provide means for overriding normal poppet operation for tank venting and as a safety feature in the event poppet 22 should become frozen in either the open or closed position during operation. Assuming that the poppet is frozen in the closed position resultant from operation in a cold environment, the overriding is accomplished by introducing pressurized fluid through port 21 and into cylinder 17 to the right of piston 33. Piston 33 is forced to the left and, since piston 33 is attached to poppet 22 via shaft 34, poppet 22 is likewise forced to the left, causing the valve to be opened. Were poppet 22 to be frozen in the open position, the overriding action would be reversed, the pressurized fluid in this case being introduced into cylinder 17 through port 20.

The purpose of spring 37 is to provide a damper between shaft 34 and poppet head 24 when the poppet is slammed shut resultant from the actuation of the override mechanism. A seal 39, preferably of the lip seal variety, may be provided to seal between the housing 16 and shaft 34. Bleed ports 40 are provided in poppet head 24 as a gas bleed from the interior of poppet 22 for maintaining a substantially constant pressure in that area regardless of leakage between surface 18 and poppet body 23 or volumetric decreases resultant from piston movement.

A pilot valve assembly generally indicated as 42 is mounted upon valve housing 11 to control the normal opening and closing of the poppet. Pilot valve 42 is generally comprised of a pilot valve housing 43 attached to valve housing 11. A flexible diaphragm 44, sealably secured across housing 43, has a plate 45 retained centrally thereof and a hollow shaft 46 axially extending away from the plate. A ring member or cage 47 is attached to or integral with the end of shaft 46 remote from plate 45 and includes an internally extending shoulder or valve seat 48. A retainer 49 is fixed within housing 43 and includes a cylindrical bore 50 through which shaft 46 is adapted to slide axially. A vent port 51 is provided adjacent the free end of shaft 46. A sealing disc 52 is normally retained against vent port 51 by a spring 53 mounted between the sealing disc and the end of shaft 46. A passage 54, indicated by dotted lines in FIG. 2, connects the interior of housing 43 adjacent diaphragm 44 with compartment 30. A passage 54a interconnects the opposite end of shaft 46 to compartment 29. Thus, when the mechanism of pilot valve 42 is in the position illustrated in FIG. 2, pressurizing gases from compartment 30 may enter the pilot valve via passage 54, traverse the hollow portion of shaft 46, circulate around and between cage 47 and seal disc 52 into passage 54a and enter compartment 29, through port 54b causing the pressure within compartments 29 and 30 to equalize.

Diaphragm 44 is normally retained in its position by a spring 55 whose force against diaphragm 44 is adjusted by screw 56, the spring force being aligned axially through the point contact of ball end 57 upon the end of screw 56. Atmospheric pressure is introduced into chamber 58, defined within adjustment portion of housing 43, through a series of tortuous passages 59 within a cap member 60 and a portion of housing 43. These passages, sometimes called a rain maze, allow the introduction of atmospheric pressure to chamber 58 while preventing the entrance of excessive moisture.

When the pressure within the storage tank and ultimately within the pilot valve to the right of diaphragm 44 of the pilot valve assembly is sufficiently great to overcome the atmospheric pressure plus the spring tension applied to the left of diaphragm 44, the diaphragm and all structure connected to and moveable with it are deflected to the left. Seal disc 52 is contacted by shoulder 48 and lifted from its seat over vent port 51. In making the initial contact, the interconnection of compartments 29 and 30 is interrupted since there can now be no flow of gas between shoulder 48 and seal disc 52. The opening of vent port 51 interconnects passage 54a, leading from compartment 29, with vent port 51 and gases contained in compartment 29 are bled through vent port 51 into a passage 61 formed within a pilot valve housing 43 and valve housing 11 and released into the main valve outlet port 14. This depressurization of compartment 29 creates a pressure unbalance over annular flange 28, moving poppet 22 to the left into the open position. The poppet remains open until such time as diaphragm 44 is re-deflected resultant from a lowering of tank pressure. The pressures within compartments 29 and 30 are then, once again, equalized. At this time, although there is no pressure unbalance directly across flange 28 to furnish a net closing force to the poppet, a portion of the pressure acting upon the flange within chamber 30 is cancelled by opposite pressure action upon annular surface 25 of poppet head 24, and a net pressure unbalance provides a large poppet closing force. A small closing force is also exerted by spring 32. Hence, the total closing force is greater than the opening force and the poppet is moved to the closed position.

Figure 4:
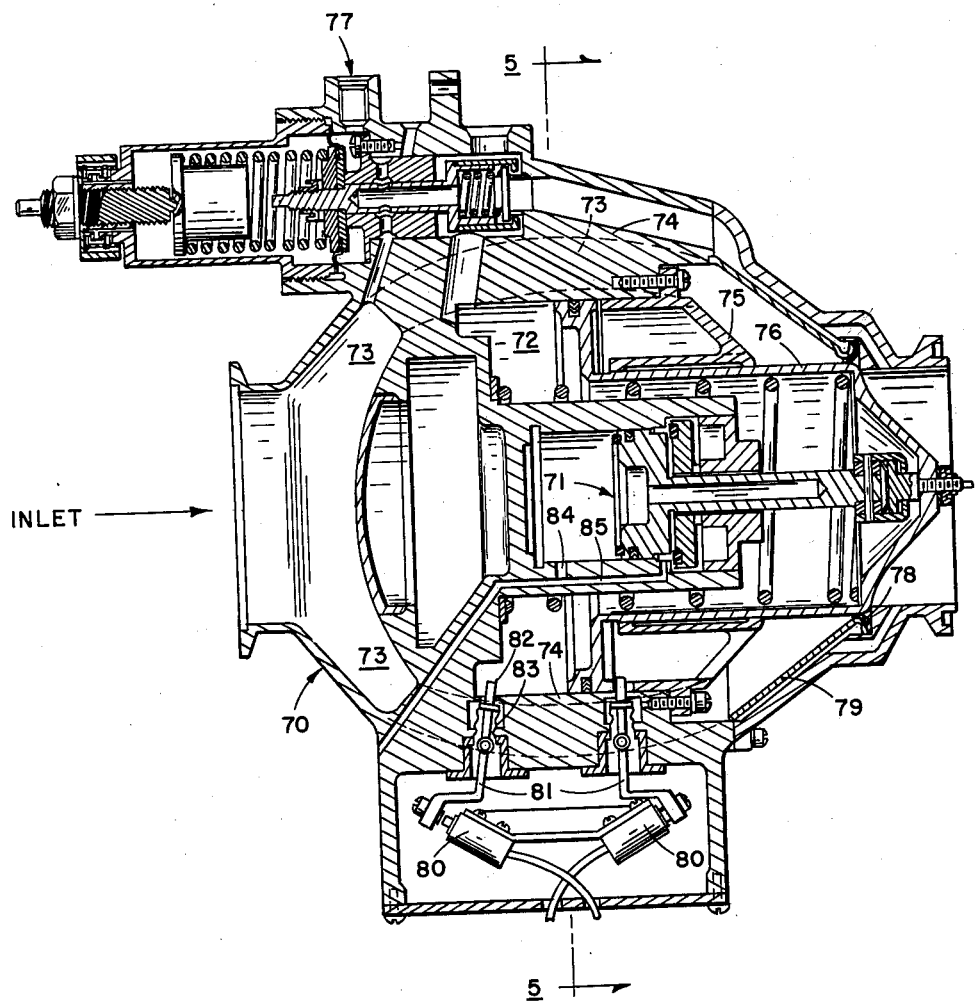
FIG. 4 is a sectional view taken along line 4—4 of FIG. 3.

FIGS. 3, 4, and 5 are representative of an alternate configuration of the invention. This is a so-called "in-line" version wherein the main fluid passage from the valve inlet port to the outlet port are in-line, rather than at right angles, as in the FIG. 2 valves. The "in-line" characteristic is generally accomplished by suspending the functional mechanism internally of the passage on a series of webs. While the general functioning of the in-line valve is essentially the same as with respect to the FIG. 2 valve, certain of the structural details have been modified.

The main valve housing 70 contains override mechanism 71 situated coaxially within a cylindrical sub-housing portion 72, both of these units being suspended internally of flow passage 73 by a series of webs 74. A poppet guide 75 is retained within cylindrical portion 72 to provide a bearing for the reciprocation therein of the body portion of poppet 76. Thus, the main bearing weight of poppet 76 is supported over its external surface by poppet guide 75, as opposed to the internal support utilized in the FIG. 2 version. This type of support allows the pressure compartment to the left of the poppet flange to communicate freely with the poppet interior, eliminating the semi-sealed chamber internally of the FIG. 2 valve. The need for a bleed port from the poppet interior is also eliminated. An alternate porting arrangement through the pilot valve assembly is also illustrated in the FIG. 4 configuration. Pressurizing gas for diaphragm acutation is introduced through port 77 from an independent source or from a line leading directly from the supply tank, as opposed to being bled directly from the valve inlet. Thus, actual storage tank pressure, rather than valve inlet pressure, is sensed.

Poppet lip seal 78 is retained in the FIG. 4 valve by a slightly flexible retainer 79 which has an action similar to that of a Belleville washer in its resilient clamping action. The retainer is flexed a slight amount upon being tightened between the lip seal and the valve housing to accomplish the desired clamping.

A pair of position switches 80 are mounted within housing 70 to give a positive indication as to the opened or closed position of the poppet. Indicator arms 81 are pivotally mounted in housing 70 adjacent the extremity of the poppet travel position on either side of the poppet flange, a tip member 82 upon each arm being contactable by the poppet flange. The indicator arm is pivoted by the poppet flange until it contacts position switch 80 which, in turn, actuates an indicator in a remote location, signalling that the poppet is in the fully open or closed position. A diaphragm 83 is secured between each indicator arm and valve housing 70 to prevent fluid passage around the indicator arms.

Passages 84 and 85 through a web 74 (as shown in FIG. 5) lead into the override mechanism cylinder for the introduction of actuating fluid.

Operation of the FIG. 4 valve may be summarized as follows: Pressurized gases evolved from the fluid storage tank to which the valve is adapted are introduced into the valve through the inlet port, and, after traversing passage 73, enter the compartment to the right of the poppet flange. The pressurization of the volumetric area on the opposite side of the flange and that interiorly of the poppet are raised via the poppet assembly passages to equal that of the right hand compartment. Since the surface areas on either side of the poppet flange are essentially equal, poppet closing force exceeds the opening force by an amount equal to gas pressure times the internal surface area of the poppet head plus the spring force, the net force holds the poppet tightly closed. When the poppet interior pressure is vented by introducing pressurized gases to the pilot diaphragm through port 77, deflecting it to the left, thus changing the passage interconnections as explained above with reference to the FIG. 2 valve, the valve closing force is overcome and the popet is caused to open.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A vent and relief valve comprising the combination of a housing containing an inlet port communicating with an independent fluid supply to be controlled in an outlet port, a poppet mounted within said housing and adapted to normally sealably close said outlet port, actuator means connected to said poppet, said poppet and said actuator means separating said housing into two compartments each normally exposed to supply pressure; and a pilot valve including passage means structurally separate from said actuator means and interconnecting said compartments, means for interrupting said interconnection responsive to an increase of supply pressure, vent means adapted for vent connection with one of said compartments only, whereby when said one compartment is vented said poppet opens to relieve excess pressure in said fluid supply and an override piston separate from and connected to said poppet for positioning said poppet responsive to an independent pressure signal.

2. A vent and relief valve for a fluid supply tank or like pressure system comprising a valve housing, a poppet reciprocally mounted within said housing, means in said valve housing defining an inlet port from a fluid supply, means in said housing adjacent one end of said poppet defining an outlet from said valve, a pressure responsive seal means surrounding said outlet, said seal adapted to seat against said poppet when said poppet is closed, poppet actuator means upon an end of said poppet opposite said seal means and separating said housing into compartments each normally mutually exposed to supply pressure, port means in said valve housing normally interconnecting said compartments, means for interrrupting said interconnection responsive to an increase of supply pressure, said vent means being responsive to said last-mentioned means for interrupting, being situated in said housing and being adapted for vent connection to one of said compartments only, whereby when said one compartment is vented said poppet opens to relieve excess pressure in said fluid supply, and a poppet override piston connected to said poppet for independently opening and closing the poppet.

3. The vent and relief valve of claim 1, wherein said seal means is a pressure actuatable seal including a lip portion free to resiliently contact said poppet and said poppet includes an annular seat positioned coaxially with said seal and adapted to be inserted axially within a free end of said seal, said free lip portion of said seal being directed generally toward said poppet.

4. A vent and relief valve controlled by a pilot valve and comprising a housing having an inlet and an outlet port, said inlet port adapted for attachment to a fluid container, a pressure actuatable lip seal retained in said housing adjacently surrounding said outlet port, a free end of said seal directed into said housing, a cylindrical poppet concentrically mounted for reciprocation within said housing, said poppet having a radially extending annular flange on one end thereof and a head on an opposite end, a periphery upon said flange adapted to seal against and slide within said housing, each side of said flange being normally exposed to pressurized gases from the fluid container, said head including an annular sealing surface insertable into and sealable within said free end of said lip seal, means in said housing defining a passage normally interconnecting each side of said flange and separate vent passage means in said housing adapted for interconnection with said first mentioned passage, and an override piston means mounted concentrically within said poppet and connected to said head for opening and closing said poppet responsive to independent pressure signals whereby valve function is controlled by the interconnection and interruption of said passages responsive to actuation of the pilot valve by supply pressure from the fluid container.

5. A vent and relief valve for pressurized fluid systems comprising a valve housing having a cylindrical portion, means in said valve housing defining an inlet to said valve, means in said valve housing defining an outlet from said valve, an override housing attached to and extending into said valve housing in axial alignment with said outlet port; a hollow poppet mounted for reciprocation within said valve housing, said poppet having a body portion slidably positioned about said override housing, a head including an annular seat upon one end of said body, and a radially extending actuator flange upon an opposite end of said body portion, the periphery of said flange slidably and sealably contacting said cylindrical portion of said valve housing and separating said housing into compartments; passage means in said housing normally interconnecting said compartments, vent passage means in said housing adapted to be interconnected with said first mentioned passage means to vent one of said compartments; an annular, pressure responsive lip seal secured internally of said valve housing about said outlet port, said seal adapted for deflection into forcible engagement with said seat responsive to fluid pressure when said seat is inserted intermediate thereof; spring means within said poppet biasing said poppet to a closed position; and a fluid actuatable override actuator including means in said override housing defining a cylinder having an opening in one end thereof, a piston slidably mounted in said override cylinder and dividing said cylinder into override actuator chambers, a shaft extending from said piston through said opening and connected to said poppet head, separate port means in said override housing communicating with opposite side of said piston for the passage of fluid to and from said override actuator chambers to override normal pressures in opening and closing said poppet.

6. A vent and relief valve according to claim 1 in which said housing inlet port and outlet port are in axial alignment, a plurality of webs extending radially inward from said housing, a cylinder mounted upon said webs centrally of said housing and closed at its end adjacent said inlet, said poppet slidably mounted within said cylinder and having a closed head on one end thereof adjacent said outlet port, an annular flange radially extending from an opposite end of said poppet and into slidable contact with said cylinder to form said compartments, a poppet retainer fixed to said cylinder and extending into bearing contact with the exterior surface of said poppet, said poppet being slidable through said retainer, and seal means upon said housing about said outlet port, said seal means adapted for sealing against said poppet head.

7. The vent and relief valve of claim 6, wherein a position indicator is installed on each side of said flange to positively indicate the position of said poppet, each of said indicators including an arm pivotally mounted in said housing and extending therethrough, a tip member upon an internal end of said arm adapted to be contacted by said opposite end when said arm is pivoted, signal means associated with said switch in a remote location, and seal means connected between said valve housing and said arm.

References Cited in the file of this patent

UNITED STATES PATENTS

| 584,799 | Thompson | June 22, 1897 |
| 746,337 | Junggren | Dec. 8, 1903 |
| 868,030 | Tanner et al. | Oct. 15, 1907 |
| 919,300 | Anderson | Apr. 27, 1909 |
| 1,764,790 | Hook | June 17, 1930 |
| 1,904,475 | Kissing | Apr. 18, 1933 |
| 2,124,619 | Kerr | July 26, 1938 |
| 2,398,775 | Beekley et al. | Apr. 23, 1946 |
| 2,693,201 | Page | Nov. 2, 1954 |
| 2,712,830 | Hugg | July 12, 1955 |